(12) United States Patent
Reeves et al.

(10) Patent No.: US 11,314,122 B2
(45) Date of Patent: Apr. 26, 2022

(54) LIQUID CRYSTAL DEVICES

(71) Applicant: Flexenable Limited, Cambridge (GB)

(72) Inventors: William Reeves, Cambridge (GB); Barry Wild, Cambridge (GB); James Harding, Cambridge (GB); May Wheeler, Cambridge (GB)

(73) Assignee: Flexenable Limited, Cambridge (GB)

( * ) Notice: Subject to any disclaimer, the term of this patent is extended or adjusted under 35 U.S.C. 154(b) by 0 days.

(21) Appl. No.: 17/066,849

(22) Filed: Oct. 9, 2020

(65) Prior Publication Data

US 2021/0109403 A1 Apr. 15, 2021

(30) Foreign Application Priority Data

Oct. 10, 2019 (GB) ..................................... 1914673

(51) Int. Cl.
| | | |
|---|---|---|
| *G02F 1/1335* | (2006.01) | |
| *G02F 1/1368* | (2006.01) | |
| *G02F 1/1362* | (2006.01) | |

(52) U.S. Cl.
CPC ...... *G02F 1/133528* (2013.01); *G02F 1/1368* (2013.01); *G02F 1/136286* (2013.01)

(58) Field of Classification Search
CPC ............... G02F 1/1347; G02F 1/13471; G02F 1/13476; G02F 1/133528; G02F 1/133351; H01L 27/1259; G03F 7/00; B32B 2457/20; G06F 2203/04103; B05D 1/00; C23C 14/00
See application file for complete search history.

(56) References Cited

U.S. PATENT DOCUMENTS

| | | | | |
|---|---|---|---|---|
| 4,241,984 A | * | 12/1980 | Leibowitz | ......... G02F 1/133528 349/162 |
| 8,976,306 B2 | | 3/2015 | He | |
| 2004/0108075 A1 | * | 6/2004 | Choo | .................. G02F 1/13378 156/510 |
| 2006/0146208 A1 | * | 7/2006 | Kim | ....................... G02B 30/27 349/15 |

(Continued)

FOREIGN PATENT DOCUMENTS

| | | |
|---|---|---|
| GB | 2134299 A | 8/1984 |
| JP | 2010097118 A | 4/2010 |

(Continued)

OTHER PUBLICATIONS

Search Report from Great Britain Patent Application No. 1914673.7, dated May 26, 2020.

(Continued)

*Primary Examiner* — Mariam Qureshi
(74) *Attorney, Agent, or Firm* — Dergosits & Noah LLP; Todd A. Noah

(57) ABSTRACT

A technique of producing a liquid crystal device, comprising: providing a cell assembly comprising a liquid crystal material contained directly between (i) a polariser component comprising an active film and no more than one support film, and (ii) a first control component including a stack of layers defining electrical control circuitry; and containing further liquid crystal material directly between the polariser component of the assembly and another control component including another stack of layers defining electrical control circuitry.

8 Claims, 9 Drawing Sheets

(56) References Cited

U.S. PATENT DOCUMENTS

| | | | |
|---|---|---|---|
| 2008/0117364 A1 | 5/2008 | Matsushima et al. | |
| 2016/0035764 A1 | 2/2016 | Watts | |
| 2017/0023718 A1* | 1/2017 | Son | G02B 5/3091 |
| 2018/0120639 A1 | 5/2018 | Shih et al. | |
| 2019/0137817 A1* | 5/2019 | Yasui | G02F 1/133528 |
| 2019/0155072 A1* | 5/2019 | Hwang | G02F 1/133345 |

FOREIGN PATENT DOCUMENTS

| | | |
|---|---|---|
| WO | 2014107875 A1 | 7/2014 |
| WO | 2017194672 A1 | 11/2017 |
| WO | 2019086567 A1 | 5/2019 |
| WO | 2019117310 A1 | 6/2019 |

OTHER PUBLICATIONS

Search Report and Written Opinion from International Patent Application No. PCT/EP2017/061319, dated Sep. 1, 2017.
Search Report and Written Opinion from International Patent Application No. PCT/EP2018/079921, dated Jan. 7, 2019.

* cited by examiner

LIQUID CRYSTAL DEVICES

CLAIM OF PRIORITY

This application claims priority to Great Britain Patent Application No. 1914673.7, filed Oct. 10, 2019, the contents of which are incorporated by reference in their entirety.

FIELD OF THE INVENTION

Some techniques of producing liquid crystal display devices involve combining two liquid crystal (LC) cells in series to improve one or more aspects of the optical output. One conventional technique involves first preparing two LC cells each comprising a LC material contained between two support components and sandwiching a polariser component between the two LC cells.

WO2019/086567 describes techniques for combining LC cells, and the inventors for the present application have worked on further developing those techniques.

There is hereby provided a method of producing a liquid crystal device, comprising: providing a cell assembly comprising a liquid crystal material contained directly between (i) a polariser component comprising an active film and no more than one support film, and (ii) a first control component including a stack of layers defining electrical control circuitry; and containing further liquid crystal material directly between said polariser component of said assembly and another control component including another stack of layers defining electrical control circuitry.

According to one embodiment, said active film comprises a dichroic doped polymer film supported by said support film.

According to one embodiment, said active film comprises the product of stretching a polymer film coated with iodine needles.

There is also hereby provided a device comprising: liquid crystal material contained directly between (i) a first control component including a stack of layers defining electrical control circuitry, and (ii) a polariser component comprising an active film and no more than one support film; and further liquid crystal material contained directly between said polariser component and another control component including another stack of layers defining further electrical control circuitry.

According to one embodiment, said polariser component comprises a dichroic doped polymer film supported by said support film.

According to one embodiment, said active film comprises the product of stretching a polymer film coated with iodine needles.

There is also hereby provided a device comprising at least two control components bonded together via a polariser component and liquid crystal material contained between the two control components and the polariser component to produce two liquid crystal cells in optical series; wherein each of the two control components comprises an array of gate lines, each associated with a respective row of pixel electrodes of the respective control component; and wherein each gate line of one of the control components and the corresponding gate line of the other control component are connected to a respective terminal of an array of terminals on one of the two control components.

According to one embodiment, the corresponding gate lines of the two control components are connected in electrical series to said respective terminal of the array of terminals on one of the two control components.

According to one embodiment, the corresponding gate lines of the two control components are connected outside one edge of an active area of the control components, and said array of terminals are located outside an opposite edge of said active area.

There is also hereby provided a device comprising at least two control components bonded together via a polariser component and liquid crystal material contained between the two control components and the polariser component to produce two liquid crystal cells in optical series; wherein each of the two control components comprises an array of source lines, each associated with a respective column of pixel electrodes of the respective control component; and wherein the source lines of both control components terminate on at an array of terminals on one of the two control components.

According to one embodiment, the source lines of a first control component of the two control components are electrically connected to routing lines on a second control component of the two control components in a region where the source lines of the second control component are interspersed with said routing lines of the second control component.

According to one embodiment, the device further comprises a patterned insulator layer in said region where the source lines of the second control component are interspersed with said routing lines of the second control component; wherein the patterned insulator layer defines windows in the regions of the routing lines; and wherein the source lines of the first control component are connected to the routing lines of the second control component via said windows.

BRIEF DESCRIPTION OF THE FIGURES

An embodiment of the present invention is described in detail hereunder, by way of example only, with reference to the accompanying drawings, in which.

DETAILED DESCRIPTION

Techniques of the present invention are described below for the example of the production of a dual cell comprising two organic liquid crystal display (OLCD) cells. An OLCD cell comprises an organic transistor device (such as an organic thin film transistor (OTFT) device) for the control component. An OTFT is characterised by an organic semiconductor channel.

Techniques of the present invention are also applicable to other types of LC display devices, and also to non-display devices such as adaptive lenses.

Techniques of the present invention are described below for the example of a dual cell comprising only a single colour filter array CFA, but the techniques are also applicable, for example, to dual cells comprising two CFAs (one in each control component half-cell), and monochromatic devices without any CFA.

Techniques of the present invention are described below for the example of a dual cell using flexible plastics support films as the support substrates for the two control component half-cells, but the techniques are also applicable to dual cells using rigid glass plates for the support substrates of one or both of the two control component half-cells.

Techniques of the present invention are described below for the example of producing a single dual cell device, but the techniques are also applicable to a mass production technique involving forming a plurality of dual cell devices from wide area starting materials (wide area plastics support sheets, wide area polariser components etc.), and including an operation of singulating the individual devices from the processed wide-area materials.

Figure 1:
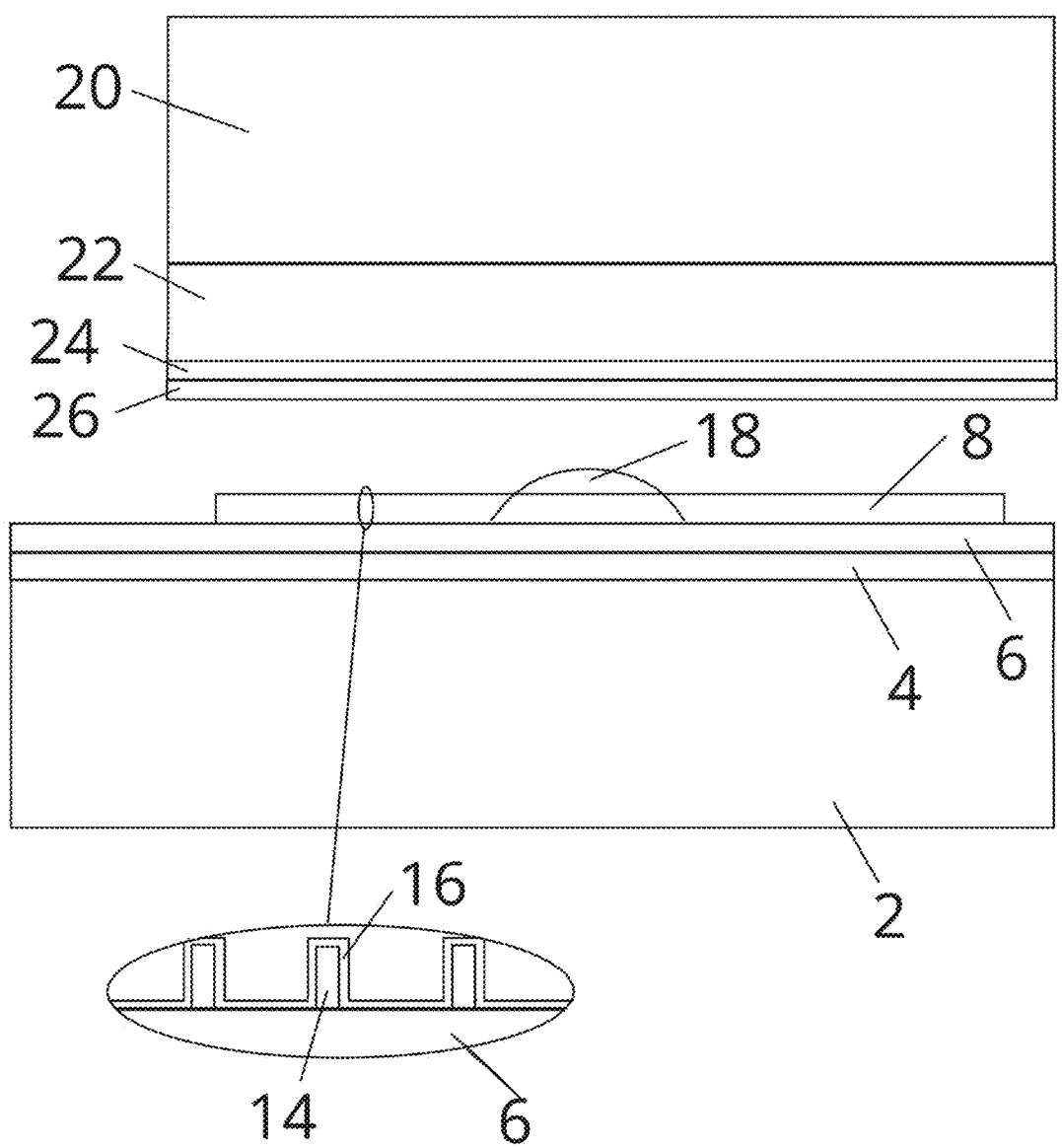
FIG. 1 illustrates the assembly of a first cell of a dual cell device according to an embodiment of the present invention.
Figure 2:
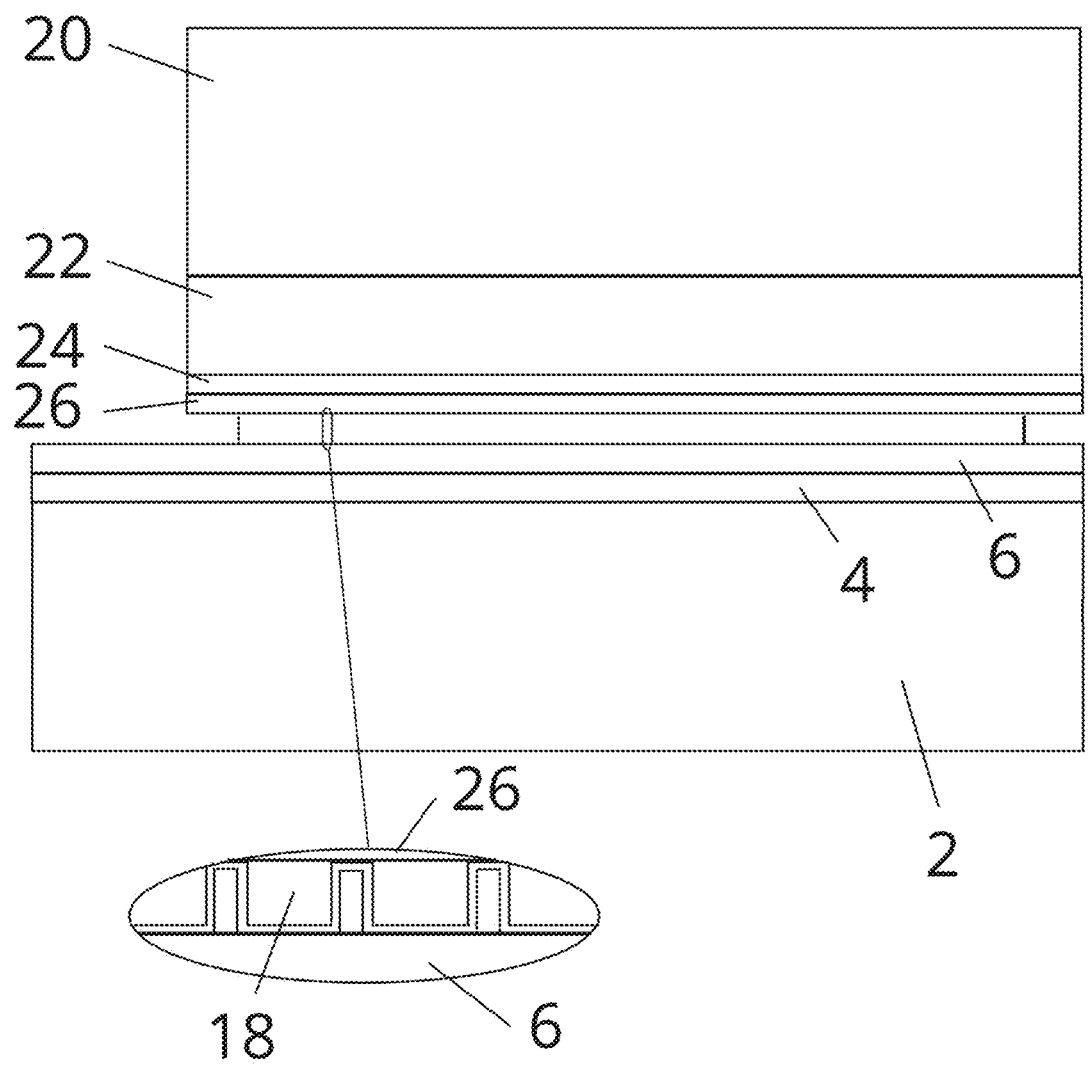
FIG. 2 illustrates the first cell of FIG. 1 after assembly.

With reference to FIG. 1, a control component half-cell of a first cell is constructed from a support substrate 2. In this example, the support substrate comprises a plastics support film such as a cellulose triacetate TAC film of less than about 100 micron thickness (e.g., 40 micron or 60 micron thickness). The plastics support film 2 is temporarily adhered to a relative rigid (e.g., glass) carrier (not shown) throughout the below-mentioned processing of the plastics support film 2.

Patterned layers of black matrix material and colour filter material are formed in situ on the support substrate 2 to define a colour filter array (CFA) 4 comprising an array of colour filters in a black matrix, each colour filter associated in the finished cell with a respective pixel electrode 130 of the control component half-cell.

A stack 6 of conductor, semiconductor and insulator layers is thereafter formed in situ on the support substrate (over the CFA 4) to define an array of pixel electrodes and electrical circuitry for independently addressing each pixel electrode via conductors outside the active display area. In this example, the electrical circuitry comprises active matrix circuitry. The stack 6 defines an array of respective thin-film transistors (TFTs), each associated with a respective pixel electrode 130. The stack 6 defines: an array of source conductors, each providing the source electrode for a respective row of TFTs/pixel electrodes and each extending to outside the active display area AA; and an array of gate conductors, each providing the gate electrode for a respective column of TFTs/pixel electrodes and each extending to outside the active display area AA. The terms "row" and "column" simply mean a pair of substantially orthogonal directions in the plane of the cell.

An array of spacer structures 14 is formed in situ on the support substrate 2 (over the stack 6), and a LC alignment layer 16 is thereafter formed in situ on the support substrate 2 over at least the entire active area AA. In this example, the spacer structures 14 are created by forming a layer of spacer structure material in situ on the support substrate, and patterning the layer of spacer structure material in situ on the support substrate by a photolithographic technique. An ordered pattern of integral spacer structures 14 is used in this example, but such integral spacers structures may be replaced by, or used in combination with, a scattering (on either one of the half-cells, preferably the counter half-cell) of pre-prepared spacers such as spacer beads/balls/fibres. The LC alignment layer 16 is formed in situ on the support substrate 2 by a liquid deposition technique such as spin-coating followed by an irradiative (or mechanical rubbing) technique to create an LC alignment surface.

The counter half-cell of this first cell comprises a polariser component including an active film 22 and only a single film 20 whose primary function is to provide structural support. With reference to FIG. 1, the preparation of the counter half-cell component begins from a pre-prepared polariser component comprising a plastics support film 20 supporting the active film 22 of the polariser. The active film of the polariser comprises a stretched polyvinylalcohol (PVA) film 22 coated (before stretching) with iodine crystalline needles. The PVA polymer chains are aligned substantially unidirectionally, and the iodine needles are aligned substantially parallel to the PVA polymer chains. The plastics support film 20 of the polariser component is temporarily adhered to a relatively rigid (e.g., glass) carrier not shown, which supports the polariser component during the below-mentioned processing of the polariser component. A protective film (not shown) is peeled away from the side of the polariser component opposite to the plastics support film 20, to expose the PVA/iodine active film 22.

A LC alignment layer 26 is formed in situ on the plastics support film 20 over the active film 22, either (a) directly on the exposed surface of the active film 22, if using a solvent for the in situ formation of the LC alignment layer 26 that is chemically compatible with the active film 22, or (b) via a cross-linked polymer layer formed in situ on the active film 22 from solution in a chemically compatible solvent. It has been found by experiment that: (i) the active film 22 remains substantially undamaged and retains good polarisation filter properties (as determined by confirming the low transmittance of unpolarised light through a combination of the processed polariser component under test and another, unprocessed polarisation component oriented at 90 degrees to the processed polariser component under test) even after exposure to some solvents; and (ii) a cross-linked polymer layer 24 formed in situ on the active film 22 by liquid processing from solution in such a chemically compatible solvent can prevent damage and substantive deterioration of the polarisation filter properties of the active film 22, throughout subsequent processing using chemically-incompatible solvents (e.g., water) that would otherwise damage the active film 22 without the cross-linked polymer layer 24.

In this example, a drop of a solution of a cross-linkable material in the solvent Propylene glycol methyl ether acetate (PGMEA) is deposited into contact with the exposed surface of the active film 22, and formed into a thin film on the exposed surface of the active film 22 by e.g., spin-coating. In this example, the cross-linkable material comprises a negative photoresist material known as SU-8 and comprising Bisphenol A Novolac epoxy and a photoacid generator. After spin-coating, the workpiece is subject to the following steps: soft bake at about 70° C. for about 10 minutes to remove most of the solvent from the SU-8 film; UV cure to effect cross-linking of the SU-8; final bake at about 70° C. for about 60 minutes; and 12 hours rest.

The LC alignment layer 26 is formed in situ on the plastics support film 20 over the cross-linked polymer layer 24 by a liquid deposition technique such as e.g., flexo-printing followed by an irradiative (or mechanical rubbing) technique to create an LC alignment surface. Flexo-printing is well suited to forming an alignment layer only in desired areas (at least the active area AA and not in the region of electrical contacts outside the active area AA) without needing any subsequent patterning operation such as etching. In the finished cell, this LC alignment surface and the opposing LC alignment surface provided by LC alignment layer 16 of the control component half-cell controls the orientation (and hence one or more optical properties) of the LC material 18 in any pixel region in the absence of an overriding electrical field created by an electric potential difference between the respective pixel electrode and a counter common electrode (which, in this example, is part of the same half-cell as the pixel electrodes).

One or more drops of LC material 18 are pre-dispensed onto the liquid crystal alignment surface of one of the half-cells in the active display area AA of the cell. The two half-cells are pressed together under vacuum so as to spread the one or more drops of LC material between the LC alignment surfaces 16, 26 over at least the active area AA. The pressing force is gradually increased until a measurement indicates that the force has reached a final pressing force value determined by calculation and/or experiment to achieve the necessary thickness of LC material in the active area AA. After releasing the external pressing force, the assembly is moved from the cell assembly equipment to sealant curing equipment where a liquid sealant (not shown) pre-dispensed (before pressing) onto one or both half-cells is cured (irradiative (e.g., UV) curing and/or thermal curing). The transfer of the assembled cell from the cell assembly equipment to the sealant curing equipment is done sufficiently quickly that the inherent stickiness of the uncured sealant and the capillary force of the LC material prevent the cell coming apart.

Without also releasing the rigid carrier (not shown) adhered to the plastics support film 2 of the control component half-cell, the relatively rigid carrier (not shown) temporarily adhered to the plastics support film 20 supporting the active film 22 of the polariser component half-cell is then released from the plastics support film 22 according to a technique described in WO2017/194672 and WO2019/086567, whose entire content is incorporated herein by reference.

Figure 3:
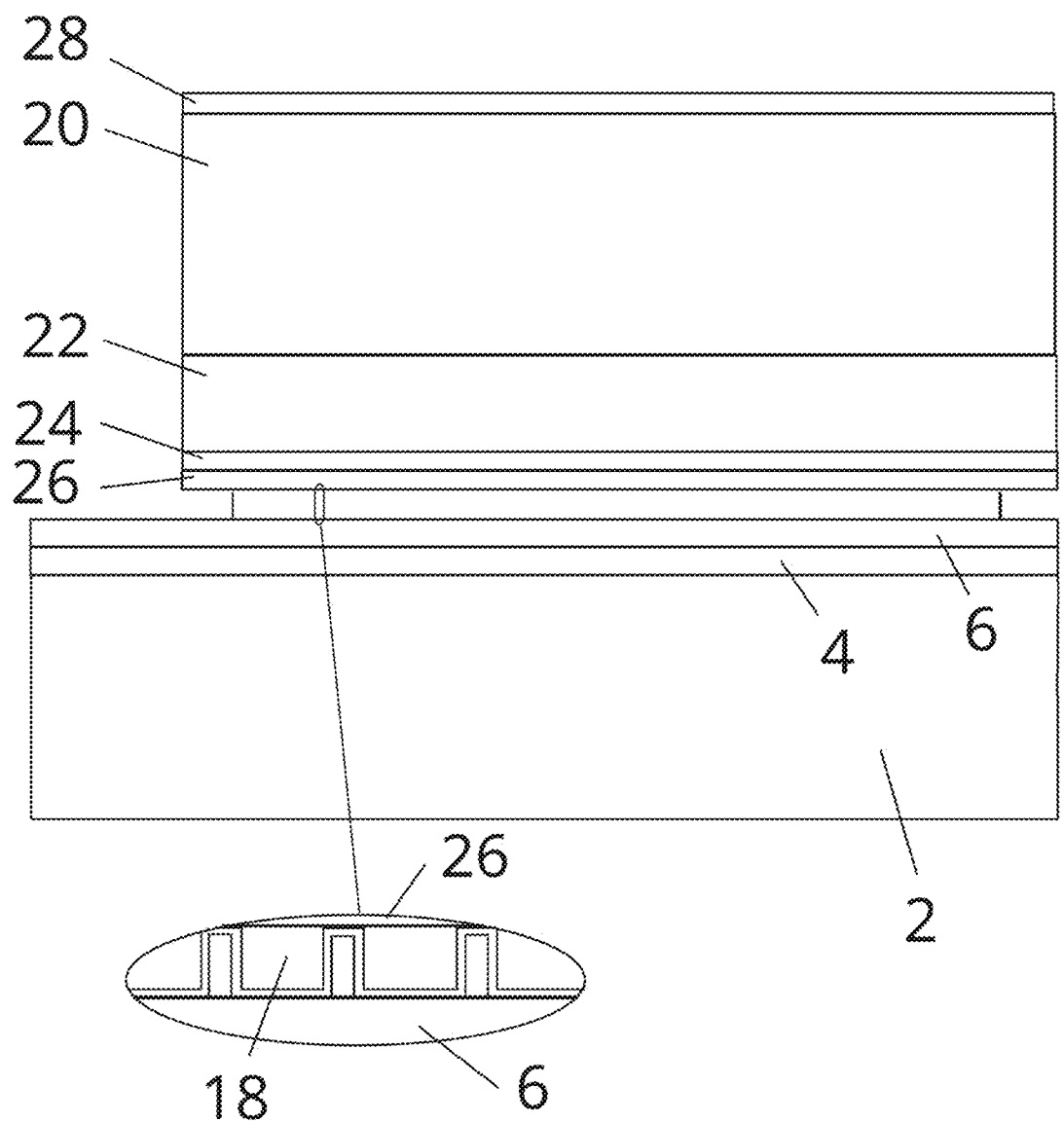
FIG. 3 illustrates the preparation of the first cell of FIG. 2 for the assembly of a second cell.

With reference to FIG. 3, a LC alignment layer 28 is then formed in situ on the exposed surface of the plastics support film 20 of the polariser component of the assembled first cell. The LC alignment layer 28 is formed in situ on the plastics support film 20 by a liquid deposition technique such as spin-coating followed by an irradiative (or mechanical rubbing) technique to create an LC alignment surface. Further functional layers may be formed in situ on the plastics support film 20 of the polariser component, such as e.g., one or more patterned, low white-light transmittance layers (e.g., a patterned metal layer) between the plastics support film 20 and the LC alignment layer 28, to shield the TFTs of the second control component mentioned below.

Figure 4:
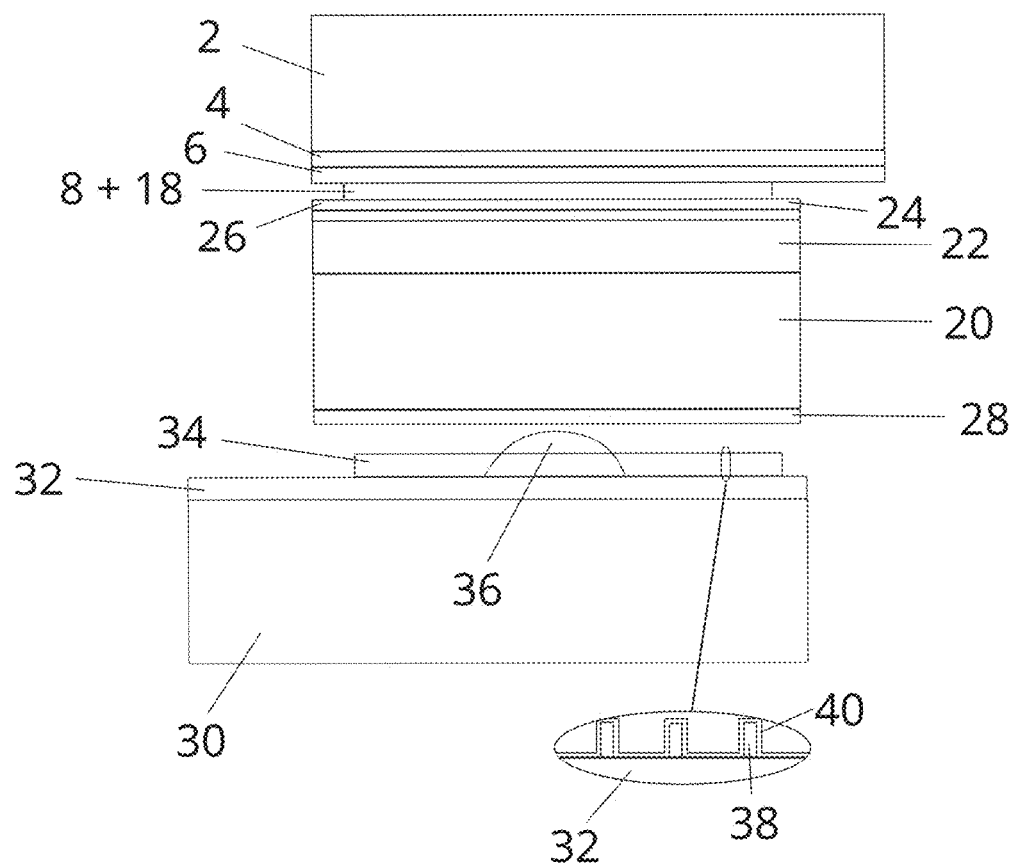
FIG. 4 illustrates the assembly of the second cell of a dual cell device according to an embodiment of the present invention.
Figure 5:
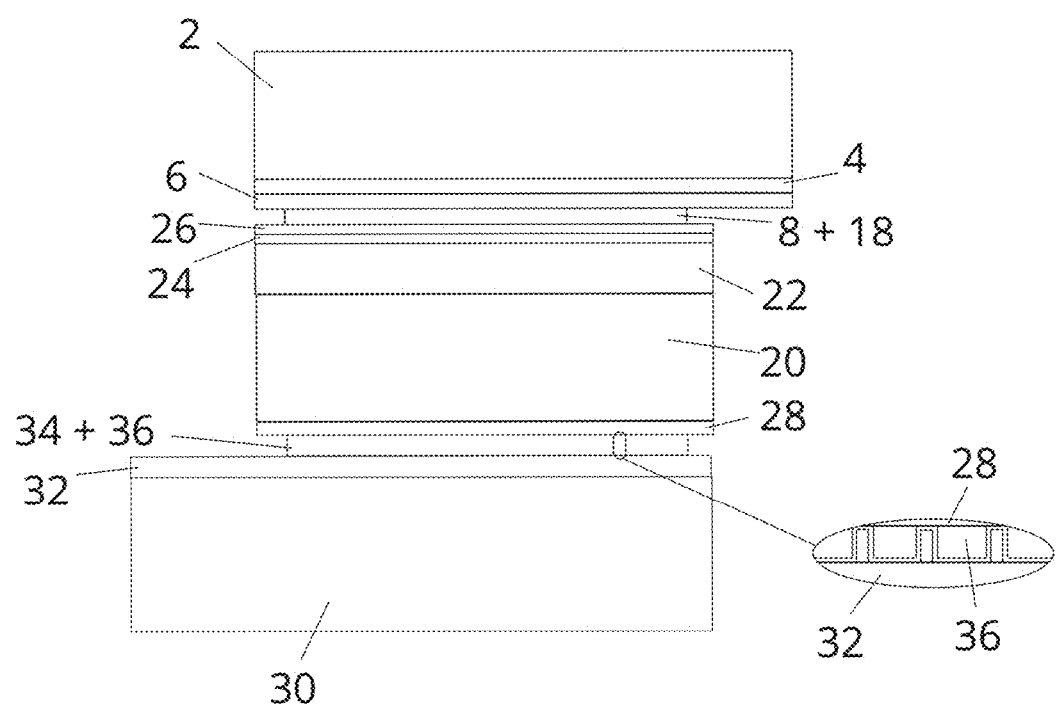
FIG. 5 illustrates the second cell of FIG. 4 after assembly.

With reference to FIG. 4, the resulting assembled LC cell with LC alignment layer 28 is used as the half-cell for the assembly of a second LC cell.

A control component half-cell of the second LC cell is constructed from a support substrate 30. In this example, the support substrate 30 of the second LC cell also comprises a plastics support film such as a cellulose triacetate TAC film of less than 100 micron thickness (e.g., 40 micron or 60 micron thickness). The plastics support film 30 is temporarily adhered to a relative rigid (e.g., glass) carrier (not shown) throughout the below-mentioned processing of the plastics support film 30.

A stack 32 of conductor, semiconductor and insulator layers is formed in situ on the support substrate 30 to define an array of pixel electrodes and electrical circuitry for independently addressing each pixel electrode via conductors outside the active display area AA. In this example, the electrical circuitry comprises active matrix circuitry. The stack defines an array of respective thin-film transistors (TFTs), each associated with a respective pixel electrode 132. The stack 32 defines: an array of source conductors, each providing the source electrode for a respective row of TFTs/pixel electrodes and each extending to outside the active display area AA; and an array of gate conductors, each providing the gate electrode for a respective column of TFTs/pixel electrodes and each extending to outside the active display area AA. Again, the terms "row" and "column" simply mean a pair of substantially orthogonal directions in the plane of the cell.

An array of spacer structures 38 are formed in situ on the support substrate 30 (over the stack 32), and a LC alignment layer 40 is thereafter formed in situ on the support substrate 2 over at least the entire active area AA. In this example, the spacer structures 38 are created by forming a layer of spacer structure material in situ on the support substrate 30, and patterning the layer of spacer structure material in situ on the support substrate by a photolithographic technique. An ordered pattern of integral spacer structures 38 is used in this example, but such integral spacer structures may be replaced by, or used in combination with, a scattering of pre-prepared spacers such as spacer beads/balls/fibres. The LC alignment layer 40 is formed in situ on the support substrate 30 by a liquid deposition technique such as e.g., flexo-printing followed by an irradiative (or mechanical rubbing) technique to create an LC alignment surface.

One or more drops of LC material 36 are dispensed onto the liquid crystal alignment surface 40 of the control component half-cell in the active display area AA of the cell over at least the active area AA; and the first LC cell (=counter component half-cell of the second LC cell) and the control component half-cell of the second LC cell are pressed together under vacuum so as to spread the one or more drops of LC material 36 between the LC alignment surfaces 28, 40 over at least the active area AA. The pressing force is gradually increased until a measurement indicates that the force has reached a final pressing force value determined by calculation and/or experiment to achieve the necessary thickness of LC material in the active area AA. After releasing the external pressing force, the assembled cell is transferred from cell assembly equipment to sealant curing equipment, where, a liquid sealant (not shown) pre-dispensed (before pressing) onto one or both half-cells is cured (irradiative (e.g., UV) curing and/or thermal curing). Again, the transfer of the assembled cell from the cell assembly equipment to the sealant curing equipment is done sufficiently quickly that the inherent stickiness of the uncured sealant and the capillary force of the LC material prevent the cell coming apart.

After assembly of the second cell, the above-mentioned rigid carriers (not shown) are then released from the outer plastics support films 2, 30 according to a technique described in WO2017/194672 and WO2019/086567, whose entire content is incorporated herein by reference.

This technique, of using a polarises component including only a single support film for the common counter component of both LC cells of the dual cell, further enables increasing the range of viewing angles over which image distortion (e.g. luminance distortion and/or colour distortion) is not observed.

An embodiment of a technique according to the present invention is described above for the example of a PVA/iodine polariser component, but the technique is also applicable e.g., to the use of other types of polariser components such as a polariser component having an active film comprising a metal pattern (wire grid) formed in situ on a single support film, without any additional support film.

Below are described further techniques which may be used in combination with the technique described above or may be used independently of the technique described above.

Figure 6:
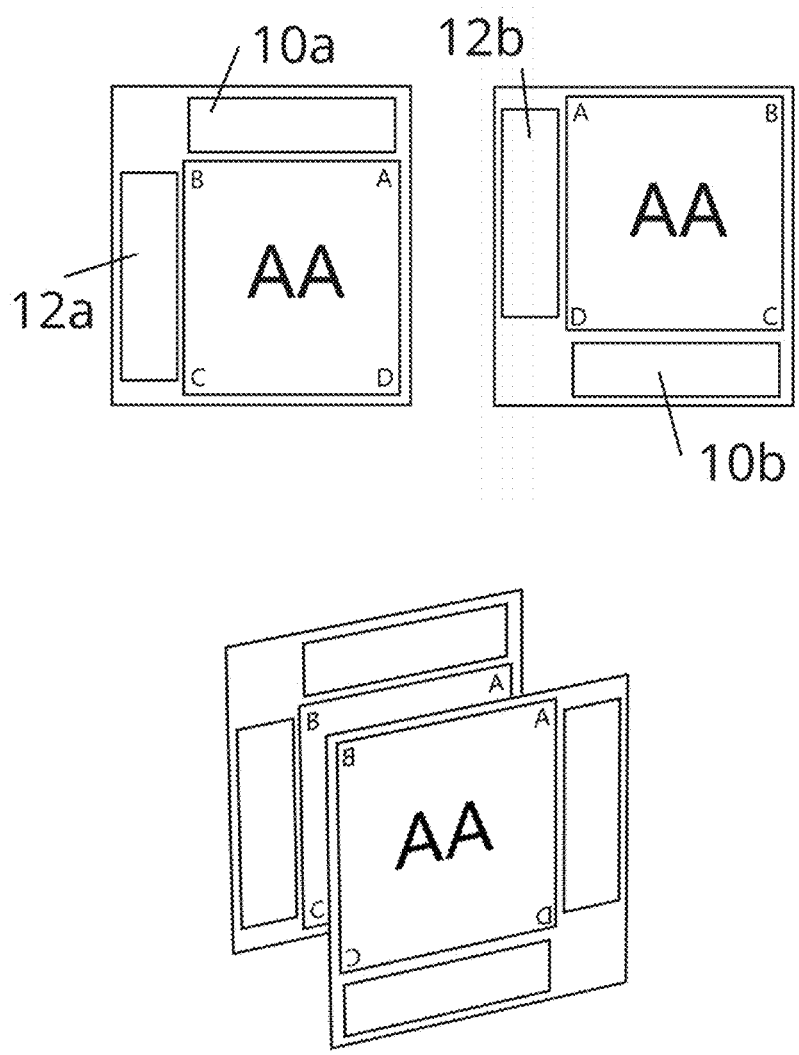
FIG. 6 illustrates one example of arranging the addressing circuitry for the two cells outside the active area.

In one example, the two LC cells are designed to be driven by respective source/gate drivers via respective source conductor terminals 12a, 12b and respective gate conductor terminals 10a, 10b outside the active area AA. With reference to FIG. 6, the control component half-cells and the polariser component are configured such that in the finished dual cell, the source conductor terminals 10a, 10b and gate conductor terminals 12a, 12b of each control component half-cell are not covered by the other control component half-cell or the polariser component.

Figure 7:
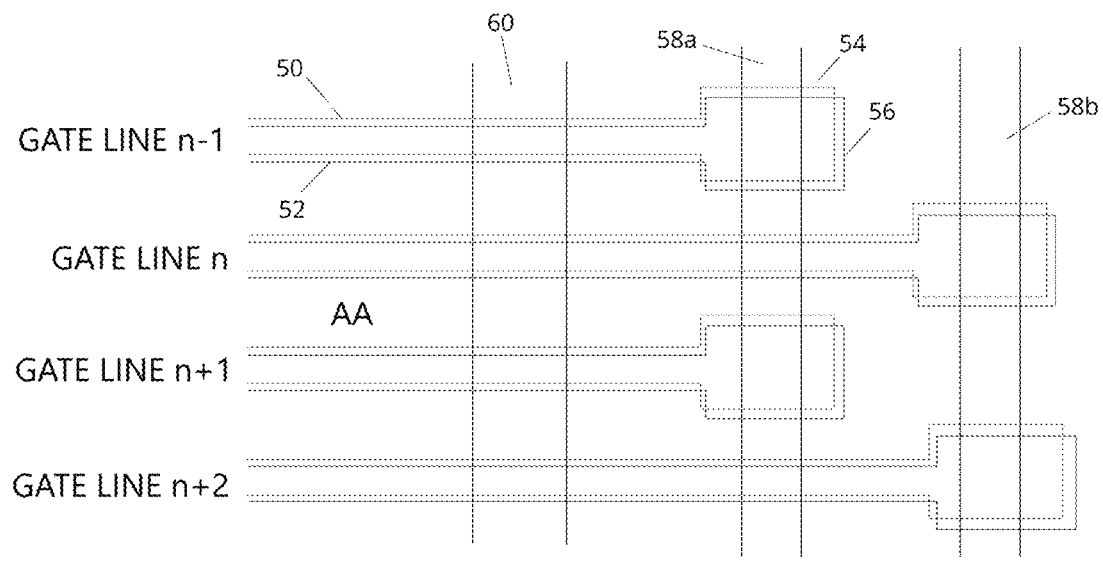
FIG. 7 illustrates one example of a technique for driving the gate lines of both cells via terminals on one of the two cells.

In another example, both the control component half-cells have the same number of gate conductors, and the gate conductors of both control component half-cells are commonly driven via gate conductor terminals on one of the two control component half-cells. FIG. 7 shows one example technique for electrically connecting each gate line conductor of one control component half-cell to the respective gate line conductor of the other control component half-cell. The gate lines 50 of e.g., the control component half-cell including the CFA 4 (hereafter referred to as the CFA control component) extend from the gate conductor terminals at one edge of the half-cell, across the active area AA and terminate in locations beyond the above-mentioned sealant 60 at an opposite edge of the half-cell. These end parts 54 of the gate lines 50 at the opposite edge of the half-cell are configured so as to facilitate electrical contact between the gate lines 50 and the gate lines 52 of the other control component half-cell via anisotropic conductor film (ACF) 58a, 58b. In more detail, the end parts 54 of the gate lines 50 are configured to have a greater width than the parts of the gate lines 52 in the active area; and the gate lines 50 terminate at different distances relative to the edge of the active area AA, to facilitate increasing the width of the end parts 54 without creating short circuits between adjacent gate lines 50. In the example of FIG. 7, the odd number gate lines 50 and even number gate lines 50 terminate at different distances from the edge of the active area AA, in the staggered manner shown in FIG. 7. The gate lines 52 of the other control component half-cell are similarly configured for bonding of the end parts 56 of those gate lines 52 to the end parts 54 of the gate lines 50 of the CFA control component half-cell via one of two ACFs 58a, 58b extending in a direction substantially perpendicular to the gate lines 50, 52.

Figure 8:
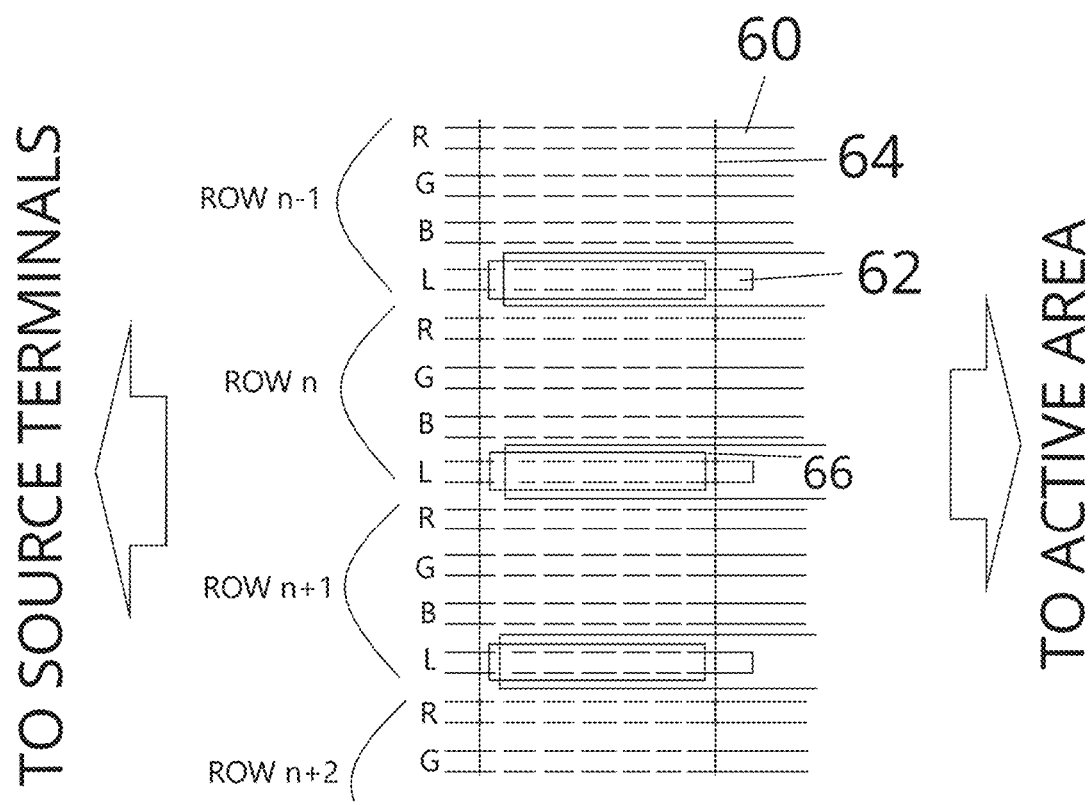
FIG. 8 illustrates one example of a technique for driving the source lines of both cells via terminals on one of the two cells.
Figure 10:
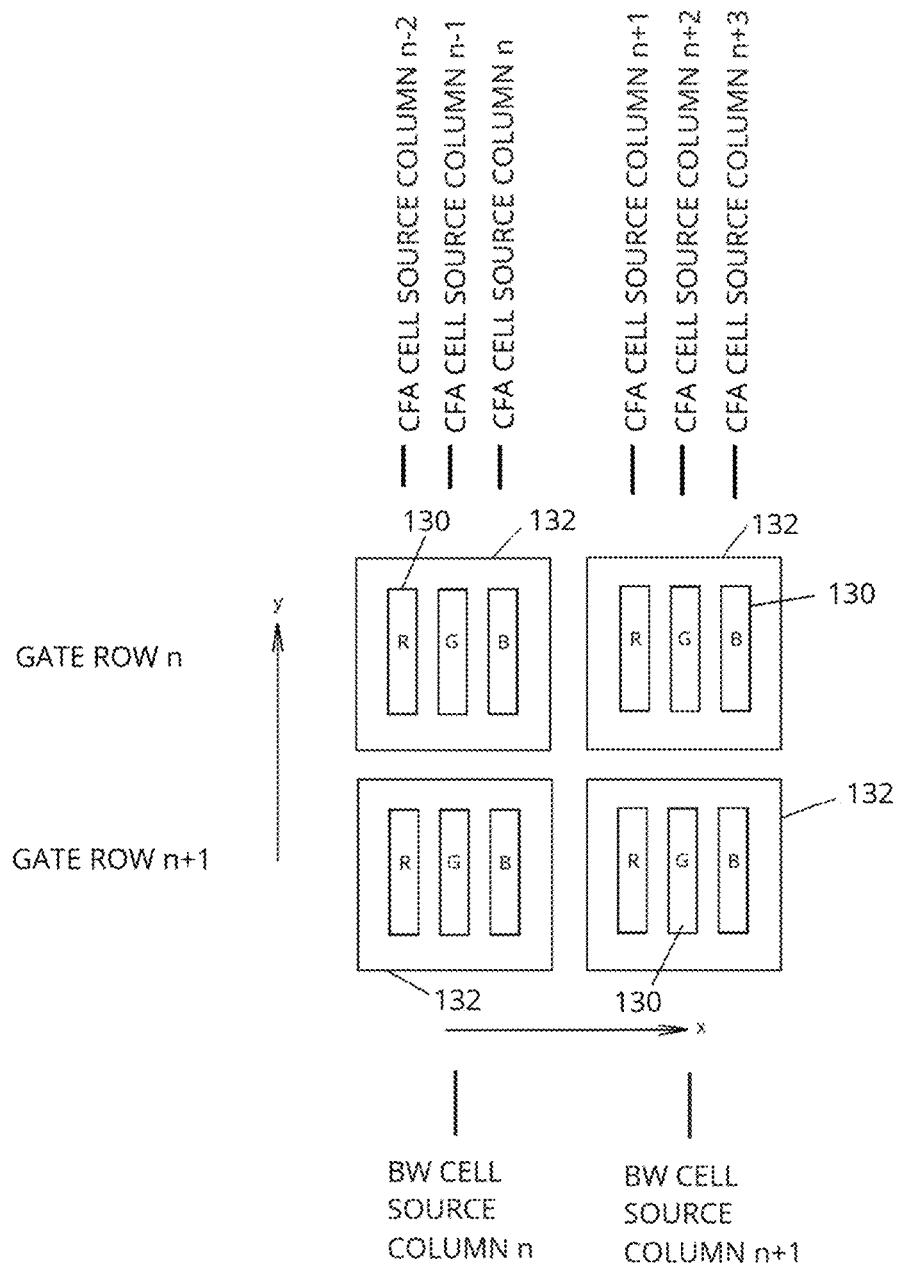
FIG. 10 illustrates an example of configuring the pixel electrodes of the two cells.

Alternatively, or additionally, the source conductor lines of both control component half-cells are commonly driven via source conductor terminals on one of the two control component half-cells. With reference to FIGS. 8 and 10, the total number of source conductor lines is different between the two control component half-cells in this example. The CFA 4 defines an array of groups of red, green and blue (RGB) filters, each filter substantially aligned with a respective pixel electrode 130 of the pixel electrode array of the CFA control component half-cell. In contrast the other control component half-cell (hereafter referred to as the monochromatic (BW) control component half-cell) includes no colour filters, and the pixel electrode array includes an array of relatively large area pixel electrodes each substantially aligned with a respective group of three RGB pixel electrodes of the CFA control component half-cell. Accordingly, the number of source conductor lines of the CFA control component half-cell is three times that of the BW control component half-cell. With reference to FIG. 8, part of the source conductor addressing circuitry of the CFA control component half-cell between the source conductor terminals of the CFA control component half-cell and the active area includes (i) proximal portions of the source conductor lines 60 (R, G and B in FIG. 8) for the TFTs of the CFA control component half-cell, and (ii) routing conductor lines 62 (L in FIG. 8) for connection to the source conductor lines for the TFTs of the BW control component half-cell, which routing conductor lines 62 are interspersed with the source conductor lines (R, G and B in FIG. 8) for the TFTs of the CFA control component half-cell. The routing conductor lines L 62 terminate before the location of the above-mentioned sealant around the active area AA, whereas the source conductor lines R, G and B 60 for the TFTs of the CFA control component continue across the active area AA. This part of the addressing circuitry between the source conductor terminals of the CFA control component half-cell and the active area AA is covered by an electrical insulator layer 64 having a pattern that defines windows 66 selectively exposing the routing conductor lines L 62 for the TFTs of the BW control component half-cell. Each routing conductor line 62 makes electrical contact with a respective source conductor line on the BW control component via a respective window 66 and an ACF film 64 extending over all conductor lines 60, 62 in this region (via the insulator layer 64 in the case of the source conductor lines 60 for the CFA control component half-cell) in a direction substantially perpendicular to the direction of the conductor lines in this region.

Figure 9:
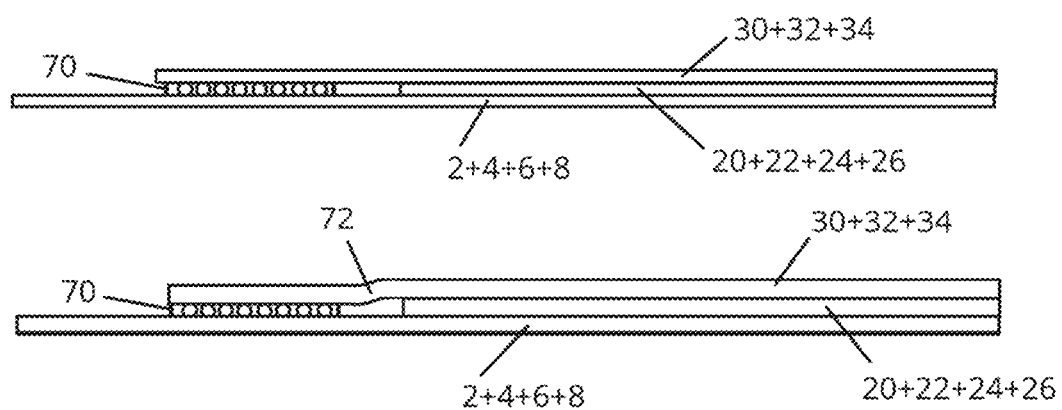
FIG. 9 illustrates examples of a technique for bonding addressing conductors on one cell to addressing conductors on the other cell.

The use of plastics support films for the support substrates 2, 30 of the control component half-cells facilitates the techniques illustrated in FIGS. 7 and 8. If necessary, one of the two plastics support films can be bent (lipped down) towards the other of the two plastics support films outside of the active area AA to enable the use of ACF 70 comprising conductive particles having a diameter sufficiently small for the pitch of the conductor arrays to be bonded together. FIG. 9 shows an example without such bending (top) and an example with bending of the BW control component half-cell in a region 72 between the active area AA and the conductor arrays to be bonded together.

As mentioned above, examples of techniques according to the present invention have been described in detail above with reference to specific process details, but the technique is more widely applicable within the general teaching of the present application. Additionally, and in accordance with the general teaching of the present invention, a technique according to the present invention may include additional process steps not described above, and/or omit some of the process steps described above.

In addition to any modifications explicitly mentioned above, it will be evident to a person skilled in the art that various other modifications of the described embodiment may be made within the scope of the invention.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features.

What is claimed is:

1. A method of producing a liquid crystal device, comprising:
providing a cell assembly comprising a liquid crystal material contained directly between (i) a first component including a stack of layers defining electrical control circuitry and (ii) a second component comprising a polariser active film and no more than one support film; and
containing further liquid crystal material directly between the second component of the assembly and a third component including another stack of layers defining electrical control circuitry;
wherein the second component comprises a cross-linked polymer layer formed in situ directly on the polariser active film, and a liquid crystal alignment layer formed in situ directly on the cross-linked polymer layer; wherein the liquid crystal alignment layer interfaces with the liquid crystal material; and
wherein the cross-linked polymer layer is formed in situ directly on the polariser active film by a process comprising: forming a film of a solution of a cross-linkable material directly on the polariser active film; baking the film of a solution of a cross-linkable material to form a baked film; UV-curing the baked film to effect cross-linking of the cross-linkable material to form a cured film; and further baking the cured film.

2. The method according to claim 1, wherein the polariser active film comprises a dichroic doped polymer film supported by the support film.

3. The method according to claim 2, wherein the polariser active film comprises the product of stretching a polymer film coated with iodine needles.

4. The method according to claim 1, wherein the baking and the further baking are done at about the same temperature.

5. The method according to claim 1, wherein the liquid crystal alignment layer is formed from a solution comprising a solvent that would damage the polariser active film without the cross-linked polymer layer.

6. The method according to claim 1, wherein containing the further liquid crystal material directly between the second component and the third component comprises depositing one or more drops of the further liquid crystal material directly onto the second component or the third component, and then pressing the cell assembly and the third component together under vacuum.

7. The method according to claim 1, comprising dispensing a liquid sealant onto one or more of the cell assembly and the third component, and curing the sealant after pressing the cell assembly and the third component together via the further liquid crystal material.

8. The method according to claim 1, wherein providing the cell assembly comprises peeling a protective film away from a polariser component to expose the polariser active film.

* * * * *